A. T. NAFIS.
REFRIGERATOR CAR.

No. 174,837.  Patented March 14, 1876.

Witnesses.
Otto Hufeland
Chas. Wahlers.

Inventor:
Abraham T. Nafis
pr
Van Santvoord & Hauff.
Attys

UNITED STATES PATENT OFFICE.

ABRAHAM T. NAFIS, OF JERSEY CITY, NEW JERSEY.

IMPROVEMENT IN REFRIGERATOR-CARS.

Specification forming part of Letters Patent No. 174,837, dated March 14, 1876; application filed October 29, 1875.

*To all whom it may concern:*

Be it known that I, ABRAHAM T. NAFIS, of Jersey City, in the county of Hudson and State of New Jersey, have invented a new and useful Improvement in Refrigerator-Cars, which improvement is fully set forth in the following specification, reference being had to the accompanying drawing, in which—

Figure 1:
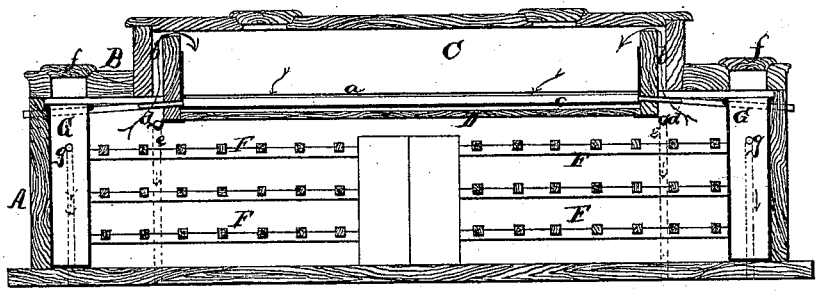
Figure 2:
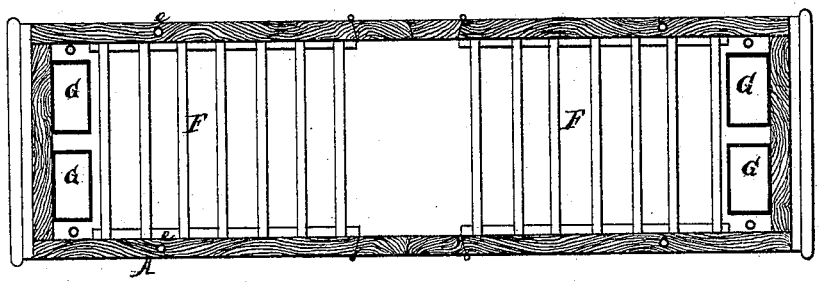
Figure 3:
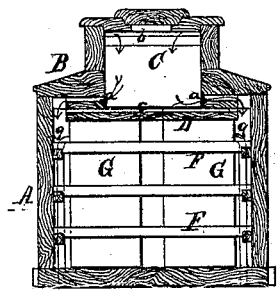

Figure 1 represents a longitudinal vertical section. Fig. 2 is a horizontal section. Fig. 3 is a transverse vertical section.

Similar letters indicate corresponding parts.

This invention relates to that class of refrigerator-cars which are provided with tanks or chambers for receiving a freezing-mixture, in order to lower the temperature in the car for preserving perishable articles during transportation.

The improvements will be fully hereinafter described, and specifically pointed out in the claims, a preliminary description being, therefore, deemed unnecessary.

In the drawing, the letter A designates the body of my car, which forms the provision-chamber, and which is provided with a roof, B, on which is arranged the ice-chamber C. The bottom part of this ice-chamber consists of a metallic trough, and said chamber is provided with openings $a\ a$ in its sides, close over the top edges of the metallic trough, and with flues $b\ b$, which are situated in its ends, and rise up nearly to its top. The warm air from the provision-chamber ascends through the flues $b\ b$ into the ice-chamber, and, after having been cooled by coming in contact with the ice, the air descends again through the openings $a\ a$. Beneath the metallic bottom of the ice-chamber, and at a small distance from the same, I have placed a non-conducting screen, D. By means of this screen a channel, $c$, is formed, and the air which circulates through this channel is cooled by coming in contact with the cold metallic bottom of the ice-chamber. On the ends of the screen D are formed gutters $d\ d$, and the moisture which condenses on the cold bottom of the ice-chamber trickles down upon the screen, whence it flows off into the gutters. By these means the moisture is prevented from dripping down into the provision-chamber. The gutters $d\ d$ communicate with waste-pipes $e\ e$, which are situated in the sides of the body A, and through which the moisture is carried off.

The provision-chamber is provided with a series of racks, F, which serve to strengthen the body of the car, and on which the meat or other articles are spread, so that the air has free access to the same from all sides. By these means I am enabled to carry a heavy load in my car without interfering with the free circulation of air throughout the provision-chamber, and without danger of overloading the car.

In the interior of the provision-chamber A I place tanks G, which are made of metal, and which are intended to be charged with a freezing-mixture, such as salt and ice. Access can be had to these tanks through apertures $f$ in the roof, which are provided with closely-fitting covers. Through these apertures the tanks are charged. Each of these tanks is provided with an overflow-pipe, $g$, which extends out through the side or bottom of the car, and which prevents the liquid in the tank from rising beyond the desired level.

If the liquid in said tanks should be permitted to rise too high, it would be liable to splash out into the provision-chamber by the motion of the car, and it would be impossible to preserve the requisite dryness in said provision-chamber.

By means of the freezing-mixture contained in the tanks G I am enabled to bring the temperature in the provision-chamber down to the desired point, and to keep it there for any length of time; and I can gage the temperature according to the nature of the load.

The tanks for a freezing-mixture may be distributed throughout the provision-chamber in any desirable manner, and they may be used either alone or in connection with the ice-chamber C. It must also be remarked that said tanks may be made either in the form shown in the drawing, or in the form of serpentine tubes, or in any other shape suitable for the purpose.

What I claim as new, and desire to secure by Letters Patent, is—

1. The combination, with the provision-chamber of a refrigerator-car, of the ice-chamber C in the roof of the car, and having a metallic bottom, the lateral passages $a\ a$ in its sides, the flues $b$ $b$ in its ends, and the non-conducting screen D at a small distance from the metallic bottom of the ice-chamber, to create a channel, all substantially as and for the object specified.

2. In combination with the ice-chamber C, the non-conducting screen D, constructed with gutters $d$ $d$ at its ends, and communicating with waste-pipes $e$ $e$, arranged in the body of the car, as and for the object specified.

In testimony that I claim the foregoing I have hereunto set my hand and seal this 19th day of October, 1875.

ABRAHAM T. NAFIS. [L. S.]

Witnesses:
 W. HAUFF,
 E. F. KASTENHUBER.